United States Patent [19]
Brearley et al.

[11] Patent Number: 4,852,953
[45] Date of Patent: Aug. 1, 1989

[54] ANTI-SKID BRAKING SYSTEMS FOR VEHICLES

[75] Inventors: Malcolm Brearley, Solihull; Mark I. Phillips, Acocks Green; Robert D. Prescott, South Yardley; Colin F. Ross, Kidderminster, all of England

[73] Assignee: Lucas Industries public limited company, Birmingham, England

[21] Appl. No.: 191,991

[22] Filed: May 9, 1988

[30] Foreign Application Priority Data

May 13, 1987 [GB] United Kingdom ............... 8711303

[51] Int. Cl.$^4$ ............... B60T 8/64; B60T 8/82; B60T 8/70
[52] U.S. Cl. ............... 303/111; 303/96; 303/106; 364/426.02
[58] Field of Search ............... 303/91, 95, 96, 100, 303/102, 103, 106, 110, 111; 188/181 C, 181 A; 364/426, 426.02

[56] References Cited

U.S. PATENT DOCUMENTS

| 4,266,833 | 5/1981 | Sato et al. | 303/110 X |
| 4,320,459 | 3/1982 | Lindemann et al. | 303/105 X |
| 4,374,421 | 2/1983 | Leiber | 303/111 X |
| 4,468,740 | 8/1984 | Beck et al. | 303/95 X |
| 4,489,382 | 12/1984 | Jonner et al. | 303/110 X |
| 4,665,490 | 5/1987 | Masaki et al. | 303/100 X |
| 4,736,994 | 4/1988 | Fennel et al. | 303/111 |

FOREIGN PATENT DOCUMENTS 0236085  9/1987  European Pat. Off. ............ 303/110

Primary Examiner—Andres Kashnikow
Assistant Examiner—Timothy Newholm
Attorney, Agent, or Firm—Scrivener and Clarke

[57] ABSTRACT

An anti-skid braking system for a vehicle comprising a supply of fluid for actuating a plurality of wheel brakes, a skid control unit interposed between the fluid supply and the brakes, sensors to detect the skidding of a plurality of wheels and actuating means responsive to skid signals from the sensors and adapted to actuate the skid control unit to relive the fluid pressure at the brake of the wheel at impending lock by means of a plurality of successive first brake release periods. In order to reduce yawing, when an impending skid condition is detected at one wheel, the skid control unit is arranged to induce second, shorter brake release periods in one or more of the brakes of the wheels not at impending lock.

14 Claims, 6 Drawing Sheets

ANTI-SKID BRAKING SYSTEMS FOR VEHICLES

DESCRIPTION

The present invention relates to anti-skid braking systems for vehicles.

Known anti-skid braking systems for vehicles comprise skid sensors on each of the wheels of the vehicle and a control unit responsive to ski signals from the skid sensors to reduce the pressure of actuating fluid to the brake of a wheel which is about to lock, thereby avoiding skidding of the wheel. Known systems fall into two categories.

Firstly, the anti-skid systems of two wheels at opposite ends of an axle may operate independently of one another, such that each wheel takes the maximum advantage of the friction available to each wheel. A disadvantage with this so-called "independent braking" is that if one of the wheels of an axle is on a surface of relatively high coefficient of friction while the other wheel is on a surface of relatively low coefficient of friction and the brakes are applied, a larger braking force will be exerted on that wheel on the higher coefficient surface, such that the vehicle may undergo a yawing motion requiring correction of the yaw by steering by the driver of the vehicle. Considerable yawing can take place if, for example, one of the wheels is on ice whereas the other is on a normal road surface, and this requires considerable skill by the driver to correct the yaw.

The alternative configuration is so-called "axle braking", wherein the braking pressure applied to each of the wheels at either end of an axle is the same, and is dependent upon the pressure applied to the brake of the wheel on the surface of lower coefficient of friction. Thus, if the two wheels on either ends of an axle are travelling on surfaces of different coefficients of friction, both brakes will be applied as though both wheels were travelling on the surface of lower coefficient of friction. This has the advantage that yawing is eliminated, but has the disadvantage that the braking distance is longer, and may be considerably longer if, for example, one of the wheels is travelling on ice, since both of the wheels will be braked as though both were travelling on ice.

It is an object of the present invention to provide an anti-skid braking system which overcomes the above disadvantages.

In accordance with the present invention, an anti-skid braking system for a vehicle comprises a supply of fluid for actuating a plurality of wheel brakes, a skid control unit interposed between the fluid supply and the brakes, sensors to detect the skidding of a plurality of wheels and actuating means responsive to skid signals from the sensors and adapted to actuate the skid control unit to relieve the fluid pressure at the brake of the wheel at impending lock by means of a plurality of successive brake release periods, wherein the skid control unit also induces shorter brake release periods in one or more of the brakes of the wheels not at impending lock.

In practice, a predetermined minimum magnitude is set for the main brake release periods in the brake at impending lock below which the sympathetic release periods in the brake not at impending lock are not made shorter but are made equal to the main brake release periods for the brake at impending lock.

The skid control unit may be adapted to induce the shorter brake release periods in the brake at the opposite end of the axle to the wheel at impending lock.

In this case, particularly if the axle is a steering axle, the yawing motion of the vehicle when the wheels are on surfaces of different coefficients of friction is greatly reduced, while still allowing the wheel on the surface of higher coefficient of friction to take advantage of the better braking allowed on that surface.

Preferably, each brake release period induced in a wheel not at impending lock is shorter than the previous induced brake release period, until a pre-set minimum period is reached whereupon the induced brake release periods are maintained at this pre-set minimum.

Alternatively, in a simpler, preferred arrangement, each brake release period induced in a wheel not at impending lock is arranged to be of the same fixed length, which, at least when the main release periods are above said predetermined magnitude, is shorter than the brake release periods of the wheel at impending lock.

Preferably, if the brake receiving the induced shorter brake release periods undergoes its own brake release period due to impending brake lock, the skid control unit is adapted to suppress the induction of shorter brake release periods induced in response to impending lock of another wheel, until a pre-set period after the locally initiated brake release period has ended.

Preferably, a shorter brake release period is only induced when the leading edge of an actuating signal is associated with the same brake as the cancelling edge of the previous actuating signal.

In one embodiment, the shorter brake release pulses may be applied to all other brakes not at impending lock, when one sensor senses an impending wheel lock. This prevents serious overshoot of pressure at all the brakes receiving the shorter brake release periods.

The skid detection thresholds may be slightly reduced until a first skid signal is detected, thereby preventing serious pressure overshoot at the first channel to detect the initial skid condition. The threshold reduction may be delayed until a pre-set point in time after the brake application is first started.

The threshold may actually be increased at the point when the brake is applied to prevent a false skid detection caused by wind-up of the suspension elements if the brakes are applied very quickly. This threshold may then be reduced to either the normal level or pulsed to a lower level.

The skid detection thresholds may be reduced when all the wheels have achieved a pre-set deceleration, lower than the threshold, within a pre-set period of the brakes being applied.

By way of example only, a specific embodiment of the present invention will now be described, with reference to the accompanying drawings, in which:-

Figure 1:
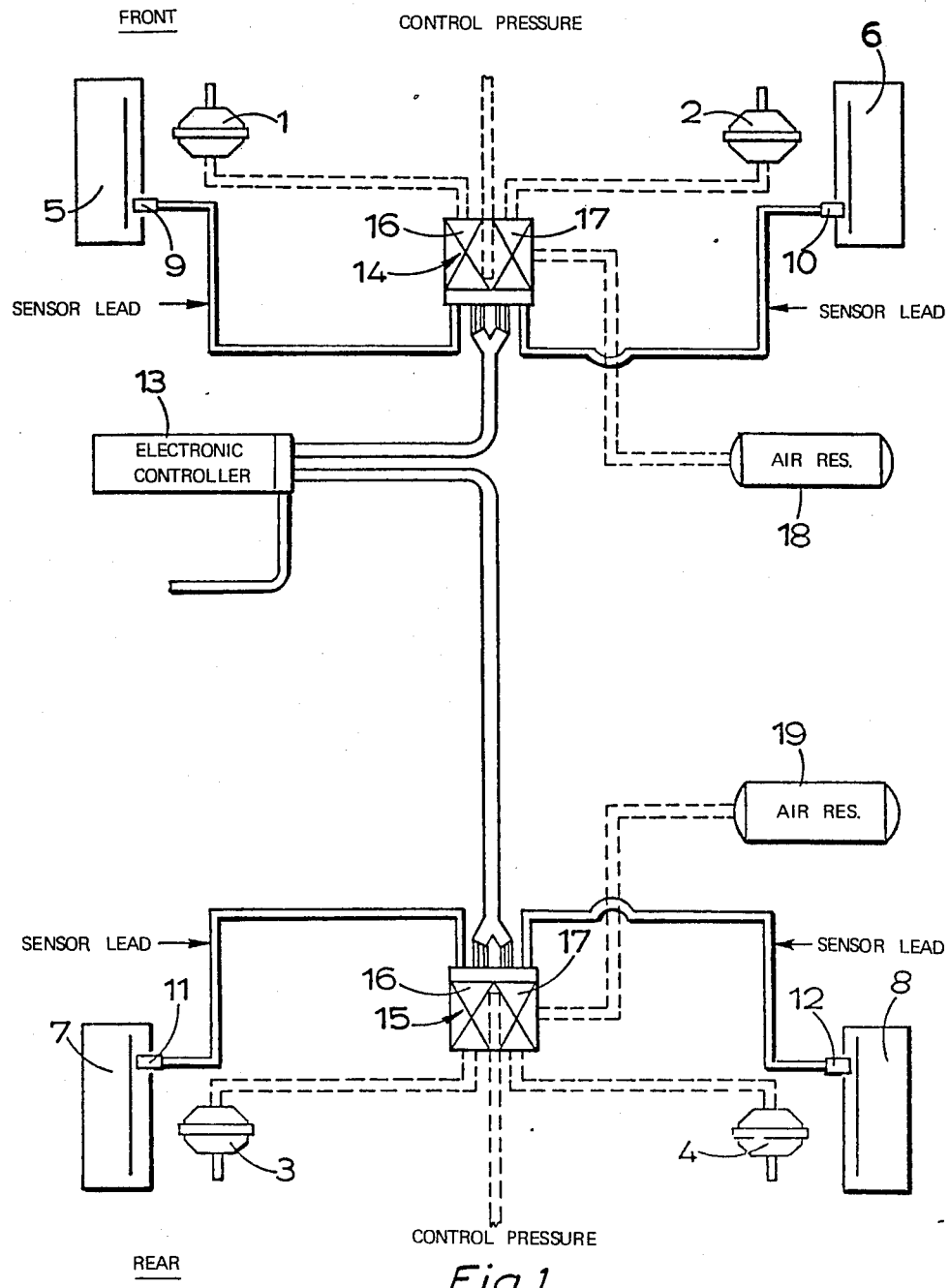
FIG. 1 is a schematic layout of a two-axle vehicle provided with a relay-operated anti-skid pneumatic system.

In the anti-skid pneumatic braking system illustrated in the drawings, brakes 1, 2, 3, 4 are provided on each of two front wheels 5, 6 on a first axle of a vehicle, and on two rear wheels 7, 8 on a second axle of the vehicle, respectively. Each wheel is provided with a respective speed sensor 9, 10, 11 and 12, and the output signals from the sensors are fed into an electronic control module 13 in the form of a microcomputer which differentiates the signals and emits energising currents for operating front and rear skid control units 14 and 15.

Each skid control unit 14, 15 controls the supply of operating pneumatic pressure under the control of a treadle valve 29 (see FIG. 2) to a relay valve 16, 17 for each respective wheel, and each relay valve 16 17 in turn, controls the supply of air under pressure from a reservoir 18,19 to the brakes 1 and 2, and 3 and 4. Since the arrangements provided on both axles are similar, only that of the front axle will be described.

Figure 2:
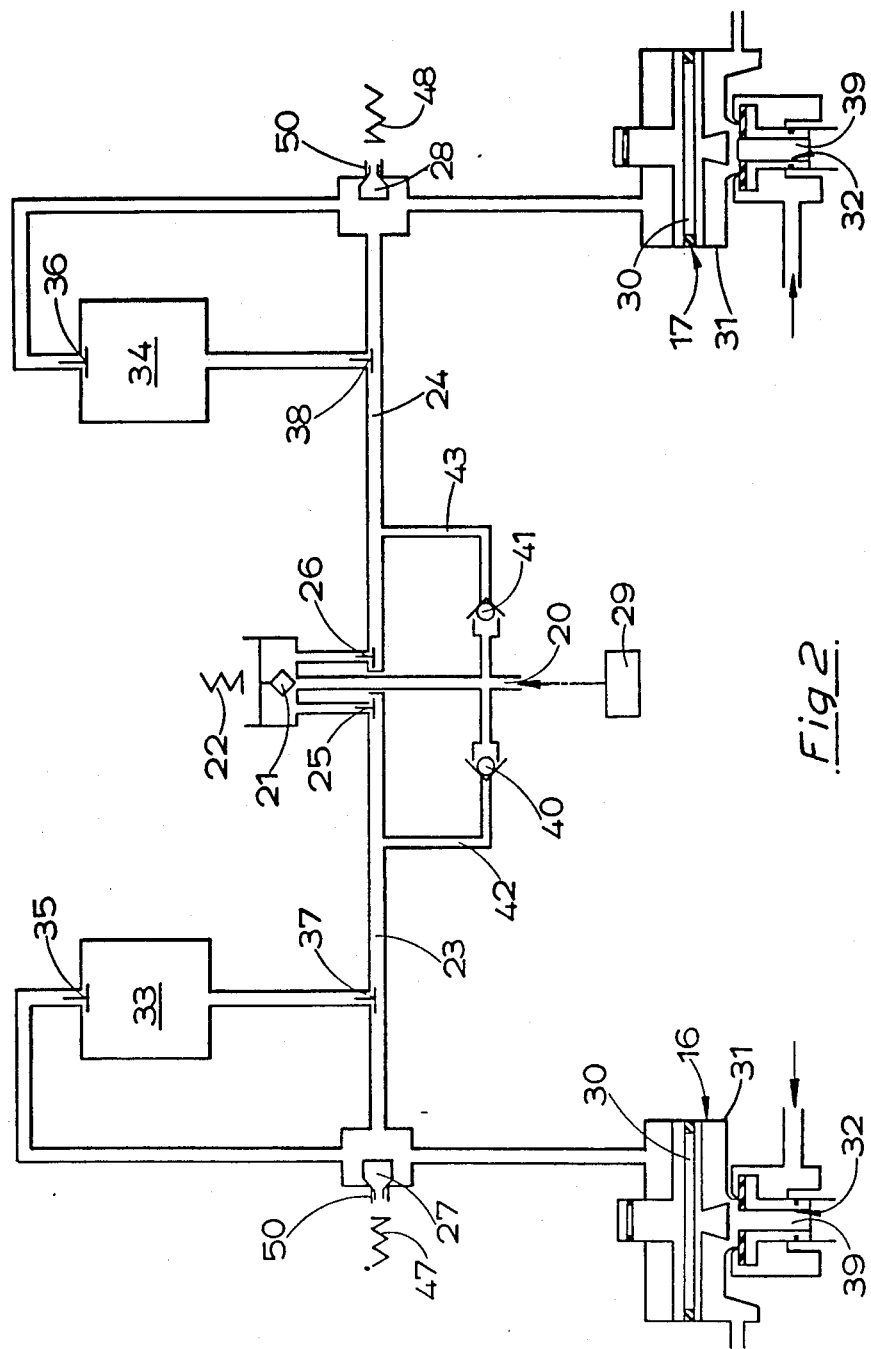
FIG. 2 is a schematic layout in more detail of the system arrangement for one of the two axles of FIG. 1.

FIG. 2 shows, schematically, the construction of the skid control unit 16 for the brakes 3, 4 on the front axle.

As illustrated, a control pressure from the treadle valve 29 is supplied to an inlet passage 20 and through a normally open latch valve 21, operated by a solenoid 22, to the two relay valves 16 and 17 through passages 23 and 24, respectively. A one-way valve 25, 26, respectively, and a solenoid-operated cut-off valve 27,28 respectively, each incorporating a normally closed exhaust port, are located in each passage 23 and 24 between the latch valve 21 and the respective relay valve 16, 17.

Each relay valve 16,17 is of known construction incorporating a piston 30 working in a bore 31 and operable, in response to the control pressure, to control a main valve 32 between the common reservoir 9, the respective brake 3, 4 and a central exhaust passage 39.

A memory chamber 33, 34 is disposed between each solenoid valve 27,28 and a connection in the passage 23,24 between the one-way valve 25, 26 and the solenoid valve 27, 28, and one-way valves 35, 36 and 7, 38 are provided between the solenoid-operated valves 27, 28 and the chambers 33, 34 and between the memory chambers 33, 34 and the passages 23, 24.

Finally a one-way valve 40, 41 is provided in a passage 42, 43 leading from the inlet passage 20 to each respective passage 23, 24 on the downstream side of the latch valve 21, between the two one-way valves 25, 37 and 26, 38 respectively.

Figure 4:
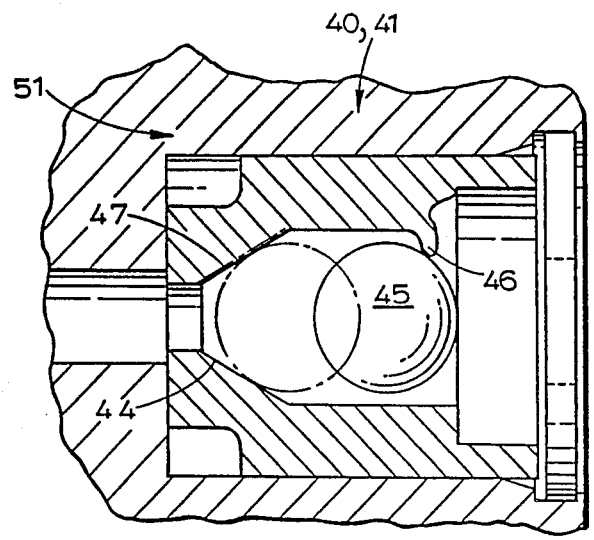
FIG. 4 is a cross-section through a one-way valve used in one embodiment of the present invention.

As illustrated in FIG. 4, each valve 40,41 comprises a seating 44 of frusto-conical outline, and a valve member 45 in the form of a ball for engagement with the seating 44. The movement of the ball 45 away from the seating is limited by three angularly spaced, inwardly directed radial fingers 46 and, when the ball 45 is in engagement with the seating 44, a limited flow past the ball is permitted through a notch 47 in the seating 44.

All the valves 21, 40, 41, 35, 37, 36, 38, 27, 28, 16 and 17 and other components (33, 34) on each axle are housed and defined within a common housing.

In a normal inoperative position shown in FIG. 2 of the drawings, the three solenoids 22, 47 and 48 are deenergised so that the latch valve 21 and the valves 27 and 28 are in the open position Both relay valves 16, 17 are closed to isolate the brakes 3 and 4 from the reservoir 19.

Upon operation of the treadle valve 29 the control pressure is supplied to the inlet passage 20, and through the open latch valve 21, since the one-way valves 40,41 are closed by that pressure. The control pressure flows through the one-way valves 25 and 26, the passages 23 and 24, and the open valves 27 and 28 to act on the pistons 30 of the relay valves 16,17. In addition the control pressure enters both memory chambers 33 and 34 through the respective one-way valves 35,36. The whole system is therefore subjected throughout to an equal control pressure.

The pressure acting on the pistons 30 causes both relay valves 16,17 to operate in a known manner to supply air under pressure from the reservoir 19 to the actuators of the brakes in order to apply both brakes 3, 4 simultaneously. The pressure rises with time as shown in the portion A, B of the graph of FIG. 3.

Upon release of the treadle at the end of the braking cycle, air from the brakes 3, 4 is released to atmosphere through the exhaust passages 39, and the control pressure is released through the one-way valves 40 and 41 and an exhaust port on the treadle valve.

When the brakes 5,6 are applied as described above, and one wheel, say wheel 5, passes onto a surface of low coefficient of friction ($\mu$) with the wheel 6 travelling over a surface of relatively high coefficient of friction ($\mu$), a so-called split $\mu$ situation arises.

The sensor 9 emits a signal which is interpreted by the microcomputer in the electronic controller 13 as being indicative of an impending skid, in response to which the electronic controller 13 energises all three solenoids 22,47,48 as described above to close the latch valve 21 and the cut-off valves 27,28.

However, preferably, there is a delay between the energising of the solenoids 47 and 48 and the energising of the latch solenoid 22. This is to provide "latch immunity". The controller monitors the solenoid firing time of solenoids 47,48 and assesses whether the firing was a "normal skid condition" or a "rough road or noise type condition" in dependence upon its length. If the skid condition was of the latter type, the short duration of the wheel solenoid firing is arranged to fail to cause actuation of the latch solenoid 22 and when the intermittent firing has passed, the brake application continues at its "normal" applied rate.

Figure 3:
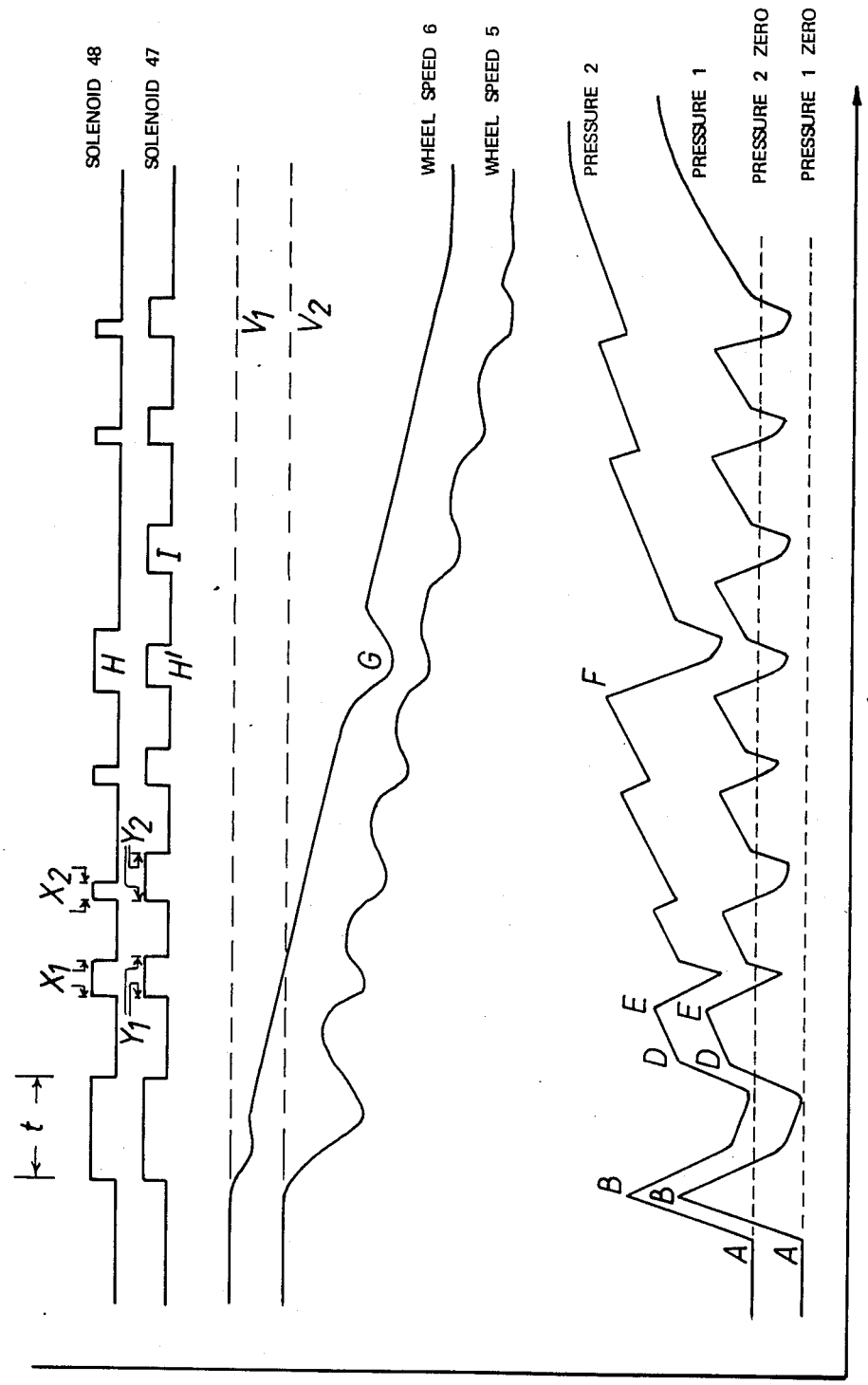
FIG. 3 is a performance graph.

It can be seen from FIG. 3 that the solenoids 47,48 are initially energised by the controller 13 for the same, fixed length of time (t), the duration of this first cycle solenoid energisation being dependent on the last of the two wheels to achieve the speed threshold indicative of that wheel no longer being about to lock. At this time both brakes are arranged to be re-applied.

Closure of the latch valve 21 which isolates the direct flow of control pressure from the inlet passage 20 to the passages 23, and 24, but a restricted flow into the passages 23 and 24 still takes place through the notches 47 in the seatings 44 of the one-way valves 40,41.

Closure of the valves 27,28 isolates the passages 23 and 24 from the relay valves 16 and 17, which close by the exhaustion to atmosphere through the exhaust port 50 of the control pressures acting on the pistons 30. The pressure then drops from points B as shown in FIG. 3.

Due to the presence of the one-way valves 35,36, a memory pressure is trapped in each memory chamber 33,34, and that pressure is equal to the value of the control pressure applied to the pistons 30 when the skid signal was emitted by the sensor 9 at the skid point.

Once the microcomputer in the electronic controller interprets from the signal from sensor 9 that the wheel 5 is no longer about to skid, the electronic controller 13 cuts off the energising current to the two solenoids 47,48 so that the valves 27,28 open again, but the solenoid 22 is held energised by the controller 13 to hold the latch valve in its closed position.

Opening the valves 27,28 enables the pressures trapped in the memory chambers 33,34 to be released through the one-way valves 37,38 to act on the pistons 30 and act as application pressures to cause the relay valves 16,17 to operate again to re-apply the brakes 1,2 as described above.

Since the volumes of the chambers 33,34 have to fill the remainder of the passages and the spaces in the bores 31 above the pistons 30, known as the application chambers, such volumes will only be sufficient to raise the brake pressure rapidly in a first stage up to a knee or changeover point D, as shown in FIG. 3, which is lower than the point B. Thereafter the brakes are re-applied, in a second stage, but at a rate of pressure increase slower than that of the first, by the flow to the relay valves 16,17 of a restricted flow of fluid through the notches 47 in the seatings of the one-way valves 40,41. This is depicted in the graph of FIG. 3 by the line D E.

The brakes 1,2 are thus re-applied to their respective wheels 5,6 but if wheel 5 is still on a low $\mu$ surface and the wheel 6 is on a relatively high $\mu$ surface, the sensor 1 will, very shortly after having the braking re-applied, detect that the wheel 5 is about to skid again, and will indicate this fact to the electronic controller 13. The electronic controller 13 thus again energises both solenoids 47,48 simultaneously, relieving the pressure on brakes 1 and 2. However, unlike the first energising, the solenoids 47,48 are not held in the energised state for the same length of time. Since the sensor 10 of wheel 6 does not indicate that the wheel 6 is about to skid, the solenoid 48 is arranged only to be energised for a short period $x_1$, determined by software in the electronic controller 13 to be shorter than the period for the previous energising of the solenoid 48 and also shorter than the period $y_1$ for which the other solenoid 47, associated with wheel 5, is energised. The period $y_1$ is dependent upon the signal from sensor 9 indicating that wheel 5 is no longer about to lock. Depending on the length of the period $x_1$, the pressure increase may be in two stages (increase from the memory chamber 34 and then a gentler increase via the one-way valve 41) or in one stage. In the example shown, the increase is in two stages, since the period $x_1$ is sufficiently long for the pressure to fall below the "knee-point" on the graph. It should be noted that for the wheel 5, which is the wheel on the low $\mu$ surface, the re-application of pressure is always in two stages, since the period y for which the solenoid 47 is energised must allow the pressure to be reduced to a very low value to prevent wheel skid occurring. Thus, the braking on wheel 6 re-commences slightly before that on wheel 5.

As before, the re-commencement of braking for wheel 5 by de-energising solenoid 47, is allowed to occur only when the wheel 5 is no longer in danger of skidding. Also as before, the sensors 9,10 are still detecting whether their associated wheels 5,6 are about to skid. When an impending skid is detected by sensor 9, the solenoids are immediately energised, thus reducing the braking pressures in the brakes 1,2. Since sensor 10 indicates that the wheel 6 is not about to skid, the electronic controller 13 energises the solenoid 48 associated with brake 2 for a period $x_2$ which is shorter than the period $x_1$ and which is also shorter than the period $y_2$, which is the time for which solenoid 47 is energised.

As explained previously, the pressure in brake 1 is always reduced to such a level that two-stage re-application of brake pressure, when permitted by sensor 9 and the controller 13, is effected. However, it can be seen from FIG. 3 that the period $x_2$ is short enough for the re-application of pressure to brake 2 to be in a single stage, since the pressure does not drop below the knee-point pressure (i.e. the pressure in memory chamber 34).

This sympathetic firing of solenoids continues for as long as necessary, but the value of x cannot fall below a minimum, predetermined value stored in the electronic controller 13. The effect of this is that the brake pressure in brake 2 gradually increases overall with time, up to the point F. However, the pressure may be increased in brake 2 to such an extent that the associated wheel 6 may then also be in danger of locking, as indicated by dip G in the wheel speed of wheel 6 on FIG. 3. It will be seen that the solenoid pulse H for solenoid 48 commences slightly earlier than that for solenoid 47, with the result that no sympathetic energising of solenoid 47 occurs, since the electronic controller 13 is arranged to produce sympathetic energising only when the leading edge of a solenoid pulse signal is from the same circuit as the cancelling edge of the previous pulse. However, the wheel 5 is still in danger of locking, and the associated solenoid 47 is energised independently to prevent this, as explained before In the example shown, the single reduction of pressure in brake 2 is sufficient to prevent locking of wheel 6. However, the wheel 5 is still in danger of locking, and the solenoid 47 is therefore repeatedly energised as previously described. However, for the first energising (I) of solenoid 47 after the pulse H of the other solenoid 48, no sympathetic energising of the solenoid 48 occurs, since the electronic controller 13 inhibits the sympathetic energising of solenoid 48 for a pre-set period, stored in the electronic controller 13, after the pulse H has ended. However, subsequent energising of solenoid 47 results in sympathetic energising of solenoid 48, since the pre-set period stored in the controller 13 has then elapsed.

Certain features of the invention are not discussed in the above example. For example, if, because of very low adhesion, the solenoid 47 is energised for longer than a pre-set time (stored in the electronic controller 13), the other solenoid 48 is energised for a second time in order to reduce the mounting pressure differential between the two brakes at opposite ends of the same axle This aims to prevent differential braking across an axle causing serious steering pull.

Also, in an alternative embodiment, when impending wheel lock is sensed at one wheel, sympathetic energising of the solenoids associated with other brakes on other axles may be induced, as opposed to merely those on the same axle. This prevents serious overshoot of pressure at all the channels.

As a further alternative, the skid detection thresholds are slightly reduced until the first skid signal is detected, thereby preventing serious pressure overshoot at the first channel which detects the initial skid condition. The threshold reduction is delayed until a pre-set point in time (stored in the controller 13) after the brake application is first started. The threshold is actually increased at the point when the brake is applied, to prevent a false skid detection caused by wind up of the suspension elements if the brakes are applied very quickly. This threshold is then reduced either to the normal level, or is pulsed to a lower level as above.

Alternatively, the skid detection thresholds are reduced when all the wheels have achieved a pre-set deceleration, lower than the threshold, within a pre-set period of the brakes being applied.

Figure 5:
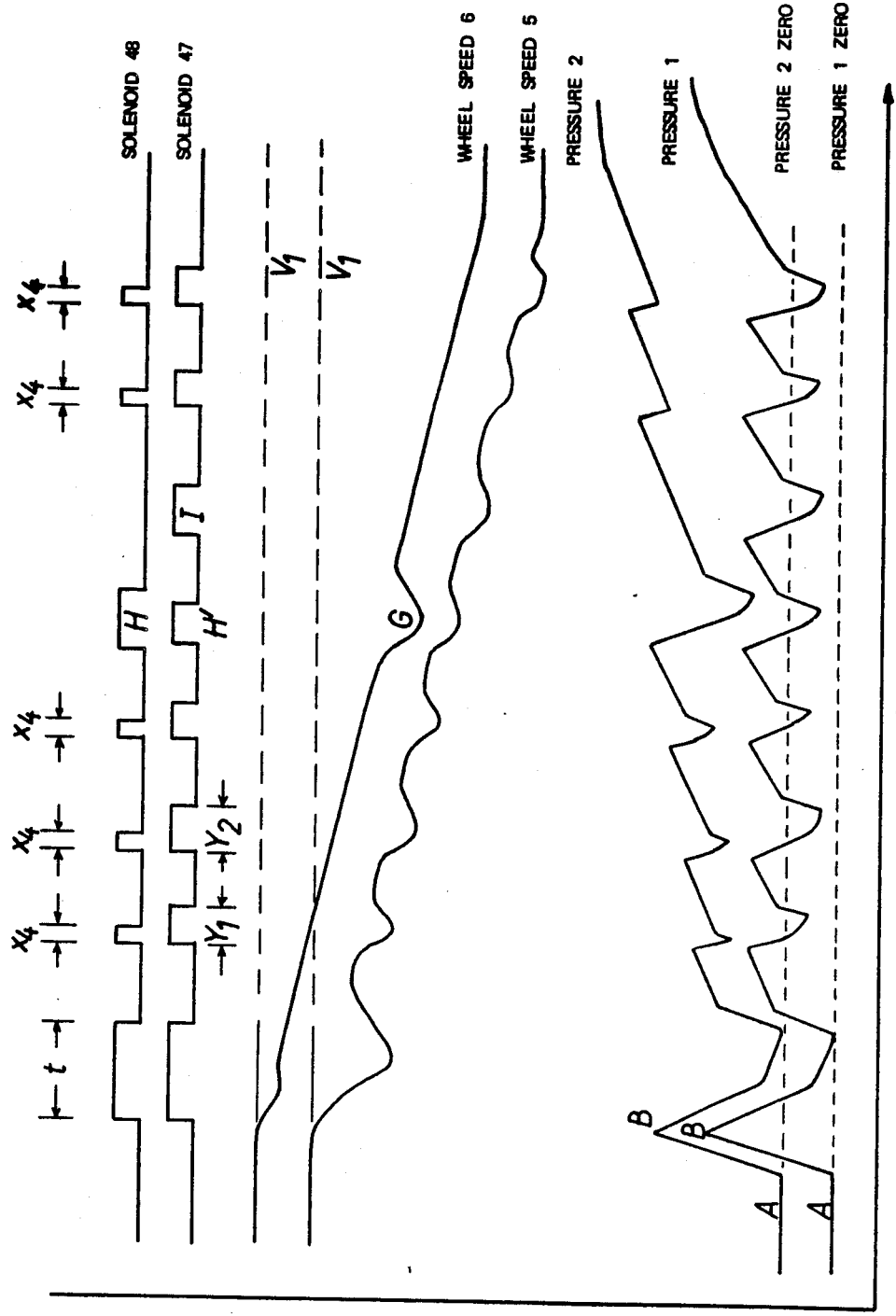
FIG. 5 is an alternative performance graph.

Whereas in the system described with reference to FIG. 3 the sympathetic pulses x are of length which progressively reduces down to a predetermined minimum, this is not essential and in other, preferred embodiments, all sympathetic firings after the first can be of a constant, short period $x_4$ as shown in FIG. 5, provided that the main activating firings $y_1$, $y_2$ are greater than the predetermined value $x_4$. For example, in a preferred embodiment, the value of $x_4$ is set at about 32 m secs. Provided that the period of any given main activating release period y is greater than 32 m secs then all sympathetic firings x following the first (t) are made of length equal to 32 m secs. However, should y ever drop below 32 m seconds, then the sympathetic firings do not remain at 32 m secs but are reduced to a value equal to that of y for as long as y remains below 32 m secs.

Figure 6:
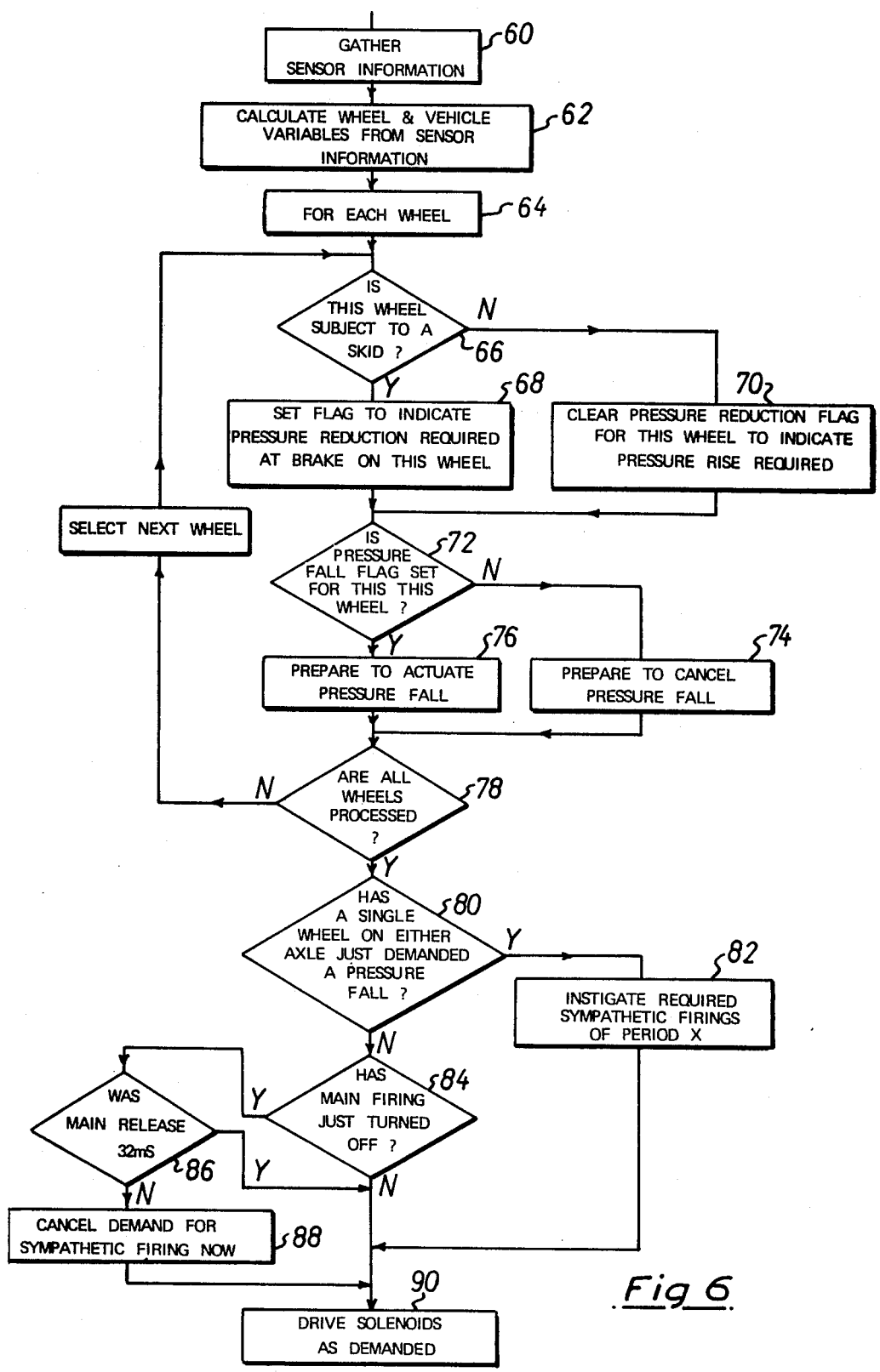
FIG. 6 is an outline flow diagram of the software of the electronic control circuitry.

Referring now to FIG. 6, there is shown very generally the software of the microcomputer in the controller 13.

Such software includes the usual initialisation routines which are carried out at reset whenever power is supplied to the computer after a period of disconnection (usually effected by the vehicle ignition switch). Following such initialisation routines, the computer gathers (60) information from the various wheel speed sensors 9,10,11 and 12 and calculates (62) wheel and vehicle variables from the sensor information. In the case of each wheel (64), the software checks (66) for that wheel being in a skid or impending skid situation and either sets (68) a pressure reduction flag or clears (70) the pressure reduction flag depending upon the check (66). Likewise the software checks (72) whether a pressure fall flag is set for that wheel. If it is not set, then preparation is made (74) to cancel the pressure fall condition. If it is set, then preparation is made (76) to actuate a pressure fall. When all wheels have been checked (78), the software checks (80) whether any wheel has just demanded a pressure fall (release). If it has, then sympathetic release periods of the other wheel(s) are instigated (82). The length of the sympathetic firings (x) is set normally at a predetermined magnitude (e.g. 32 m secs). The software monitors (84) whether the main firing (release) has just turned off. If it has, the software then checks (86) whether the main release Period (y) at the wheel at impending lock was greater than the selected predetermined magnitude (32 m secs). If it was not, then the demand for sympathetic firing is immediately cancelled (88). The result is that if the main release period (y) exceeds 32 m secs, then the sympathetic firings (x) have a constant duration equal to 32 m secs but if the main release period was less than 32 m secs, then the release period at the wheels not at impending lock is set at the same duration as for the wheel which is at impending lock. The solenoids (47,48) for releasing the brakes at the relevant wheels are then driven accordingly (90).

Figure 7:
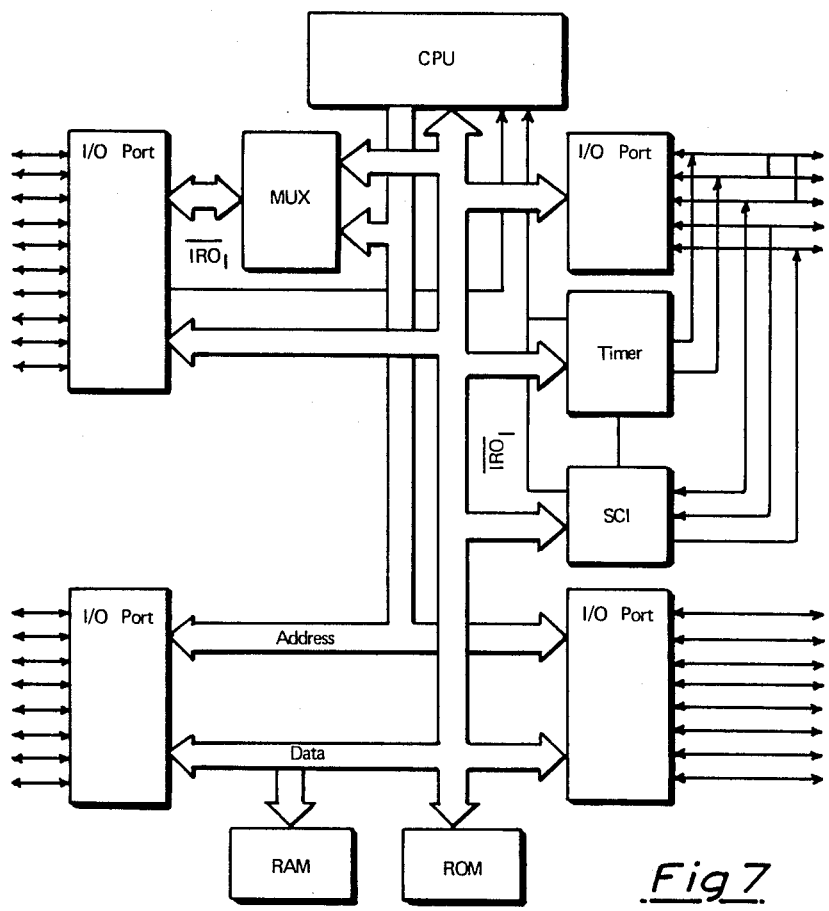
FIG. 7 shows the basic microprocessor layout which acts on software program in accordance with the performance graphs.

Finally, FIG. 7 shows a very general layout of the microcomputer in the controller 13 which operates on the incoming sensor operation to derive the solenoid release operations shown in FIG. 3 or FIG. 5.

We claim:

1. In an anti-skid braking system for a vehicle comprising a supply of fluid for actuating a plurality of wheel brakes, a skid control unit interposed between the fluid supply and the brakes, sensors to detect the skidding of a plurality of wheels and actuating means responsive to skid signals form the sensors and adapted to actuate the skid control unit to relieve the fluid pressure at the brake of the wheel at impending lock by means of a plurality of successive first brake release periods, means effective such that, when an impending skid condition is detected at one wheel, the skid control unit also induces second brake release periods in at least one of the brakes of the wheels not at impending lock, said second periods being of shorter duration than said first periods, at least when said first periods are above a preset minimum length for said second periods, and, once initiated, the control of the lengths of said second periods being wholly independent of the controlled response of the said one wheel, unless the length of said first brake release periods is shorter than said minimum preset length for the said second periods.

2. An anti-skid braking system according to claim 1, including means for varying the length of said second brake release periods such that each successive shorter, second brake release period induced in a wheel not at impending lock is arranged to be of the same fixed length, shorter than said first brake release periods of the wheel which is at impending lock.

3. An anti-skid braking system according to claim 2, including means operable such that, if the brake receiving the induced shorter, second brake release periods undergoes its own brake release period due to impending brake lock, the skid control unit is adapted to suppress the induction of shorter brake release periods induced in response to impending lock of another wheel, until a pre-set period after the locally initiated brake release period has ended.

4. An anti-skid braking system according to claim 2, including means for varying the length of said second brake release periods such that a shorter, second brake release period is only induced when the leading edge of an actuating signal is associated with the same brake as the cancelling edge of the previous actuating signal.

5. An anti-skid braking system according to claim 2, including means for varying the length of said second brake release periods such that, second brake release periods are arranged to occur at all other brakes not at impending lock, when the sensor associated with any one brake senses an impending wheel lock at that brake.

6. An anti-skid braking system according to claim 2, including means for varying skid detection thresholds such that the skid detection thresholds are slightly reduced until a first skid signal is detected, thereby preventing serious pressure overshoot at the first channel to detect the initial skid condition.

7. An anti-skid system according to claim 6, including means for delaying said threshold reduction until a pre-set point in time after the brake application is first started.

8. An anti-skid system according to claim 2, including means for varying skid detection thresholds such that the skid detection thresholds are increased at the point when the brake is applied in order to prevent a false skid detection caused by a wind-up of suspension elements if the brakes are applied very quickly.

9. An anti-skid system according to claim 8, including means operable such that, following a period of threshold increase, the threshold is either reduced abruptly to a normal level or is pulsed to a lower than normal level.

10. An anti-skid system according to claim 2, including means for varying initial skid detection thresholds such that the initial skid detection thresholds are reduced when all the wheels have achieved a pre-set deceleration, lower than the initial threshold, within a pre-set period of the brakes being applied.

11. An anti-skid system according to claim 2, wherein the skid control unit is includes means for inducing the shorter second brake release periods in the brake at the opposite end of an axle to the wheel at impending lock.

12. An anti-skid braking system according to claim 1, including means for varying the length of said second brake release periods such that each said second period is always shorter than said first period when said first period is above said predetermined magnitude but is made equal to said first period when said first period is below that predetermined magnitude.

13. In an anti-skid braking system for a vehicle comprising a supply of fluid for actuating a plurality of wheel brakes, a skid control unit interposed between the fluid supply and the brakes, sensors to detect the skidding of a plurality of wheels and actuating means responsive to skid signals from the sensors and adapted to actuate the skid control unit to relieve the fluid pressure at the brake of the wheel at impending lock by means of a plurality of successive first brake release periods, means effective such that, when an impending skid condition is detected at one wheel, the skid control unit also induces second brake release periods in one or more of the brakes of the wheels not at impending lock, said second periods being of shorter duration than said first periods, at least when said first periods are above a predetermined magnitude, and each said second brake release period induced in a wheel not at impending lock being arranged to be shorter than the previous said second brake release period, until a pre-set minimum period is reached whereupon the induced second brake release periods are maintained at this pre-set minimum.

14. In an anti-skid braking system for a vehicle comprising a supply of fluid for actuating a plurality of wheel brakes, a skid control unit interposed between the fluid supply and the brakes, sensors to detect the skidding of a plurality of wheels and actuating means responsive to skid signals from the sensors and adapted to actuate the skid control unit to relieve the fluid pressure at the brake of the wheel at impending lock by means of a plurality of successive first brake release periods, means effective such that, when am impending skid condition is detected at one wheel, the skid control unit also induces second brake release periods in one or more of the brakes of the wheels not at impending lock, the control of the lengths of said second periods, once initiated, being wholly independent of the controlled response of the said one wheel, unless the length of said first brake release periods is shorter than a minimum preset length for the said second periods, each said second period always being shorter than the corresponding said first period when said first period lies above said preset length but is made equal to said first period should said first period be below said preset length.

* * * * *